United States Patent
Reeves et al.

(10) Patent No.: US 6,248,952 B1
(45) Date of Patent: Jun. 19, 2001

(54) WIRING PROTECTION DRESS FOR AUTOMOTIVE ELECTRICAL WIRING EXTENDING BETWEEN A SPLASH SHIELD AND TUBULAR CONDUITS

(75) Inventors: Jeffrey A. Reeves, Cortland, OH (US); Andreas Lindenbach, Hagen (DE)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/270,903

(22) Filed: Mar. 15, 1999

(51) Int. Cl.[7] ............................................. H02G 3/18
(52) U.S. Cl. .................... 174/65 R; 174/151; 248/56; 439/471; 285/179; 16/2.1
(58) Field of Search .................. 174/65 R, 65 G, 174/135, 151, 152 G, 153 G, 153 R; 16/2.1; 248/56; 439/471; 285/179

(56) References Cited

U.S. PATENT DOCUMENTS

| | | | |
|---|---|---|---|
| 1,275,439 | * 8/1918 | Johnson | 174/65 R |
| 1,650,233 | * 11/1927 | Plunkett | 174/65 R |
| 1,774,151 | * 8/1930 | Olley | 285/179 |
| 3,224,796 | * 12/1965 | Burkitt | 285/161 |
| 3,229,026 | * 1/1966 | Sulzer | 174/65 |
| 4,103,101 | * 7/1978 | Maier | 174/65 R |
| 4,233,469 | * 11/1980 | Steppe | 174/83 |
| 4,702,274 | * 10/1987 | Kramer | 137/515.5 |
| 4,731,501 | * 3/1988 | Clark et al. | 174/65 R |
| 4,808,774 | * 2/1989 | Crane | 174/135 |
| 4,860,791 | * 8/1989 | Putman | 137/565 |
| 5,285,013 | * 2/1994 | Schnell et al. | 174/65 R |
| 5,488,198 | * 1/1996 | Kramer | 174/48 |
| 5,700,977 | * 12/1997 | Ford et al. | 174/64 |
| 5,893,589 | * 4/1999 | Bleitz et al. | 285/184 |
| 6,053,456 | * 4/2000 | Dispenza | 248/56 |
| 6,080,933 | * 6/2000 | Gretz | 174/65 R |

* cited by examiner

Primary Examiner—Dean A. Reichard
Assistant Examiner—Adolfo Nino
(74) Attorney, Agent, or Firm—Richard A. Jones

(57) ABSTRACT

A protective splash shield assembly for electrical wiring has a plurality of fasteners installed in slots. The fastener has an elbow shaped conduit guide connected thereto with a distal end connected to a corrugated tubular conduit that extends along a wall of the splash shield. The fastener has a conduit connected to it that extends transverse from the splash shield.

14 Claims, 5 Drawing Sheets

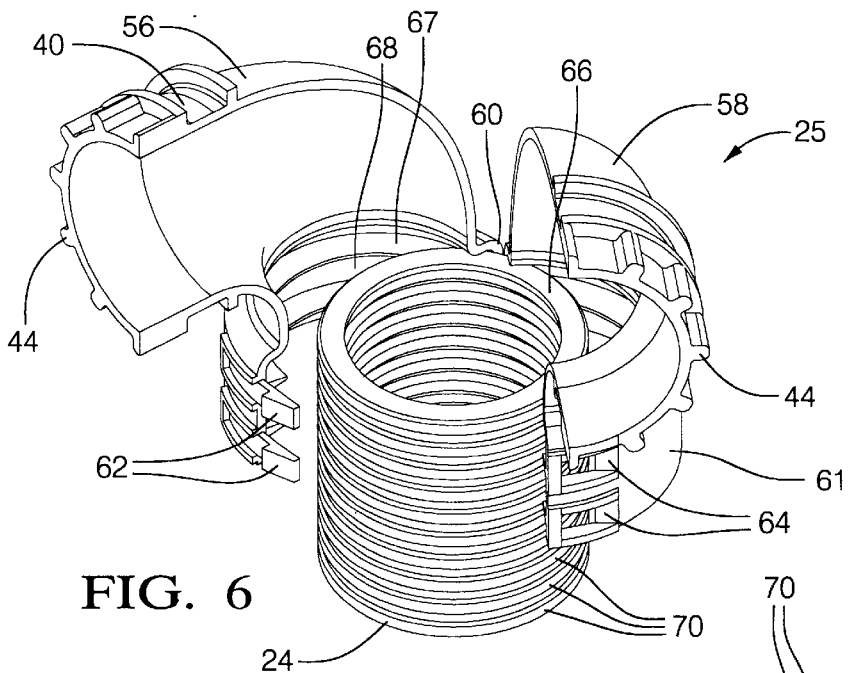
FIG. 6
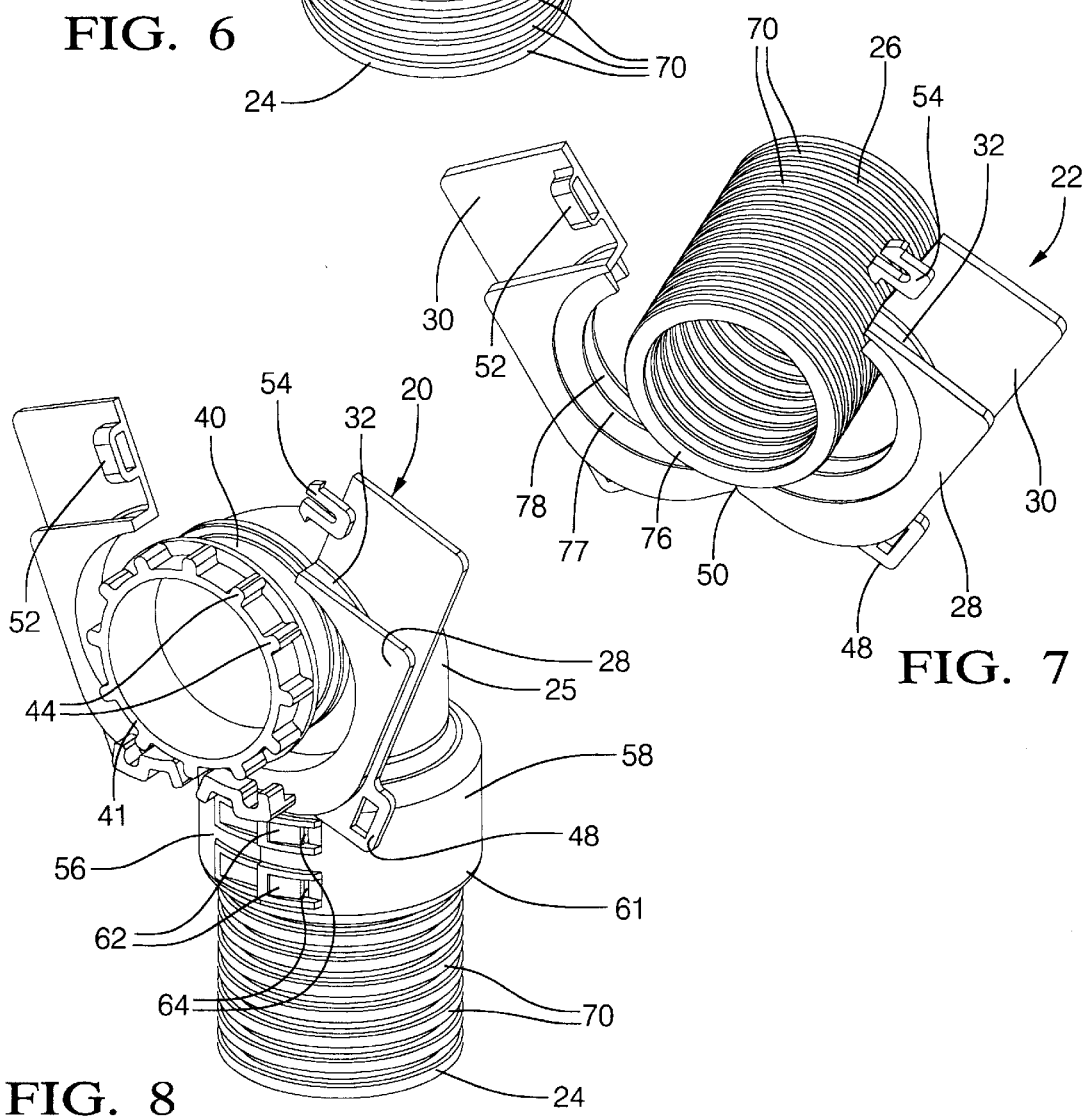
FIG. 7
FIG. 8

WIRING PROTECTION DRESS FOR AUTOMOTIVE ELECTRICAL WIRING EXTENDING BETWEEN A SPLASH SHIELD AND TUBULAR CONDUITS

TECHNICAL FIELD

This invention relates generally to protective shielding for automotive electrical wiring that extends out from a splash shield to a flexible plastic axially slit corrugated conduit.

BACKGROUND OF THE INVENTION

Splash shields are well known to provide a degree of protection to electrical wiring in automotive use. Electrical wiring harness bundles enter and exit the splash shield and run through flexible corrugated plastic conduit.

What is desired is an adaptable protective shielding that protects electrical wiring extending from a splash shield to a protective conduit that can run along the splash shield. What is also desired is a protective device that can allow for rotatable adjustment of the conduit along the wall. What is also desired is a protective device that allows differently sized protective conduits to be attached to the splash shield.

SUMMARY OF THE INVENTION

In accordance with one aspect of the invention, a wiring protective dress for electrical wiring extends between a splash shield member and a flexible corrugated tubular conduit. The protective dress includes an elbow member having a passage through which the electrical wiring can extend. The elbow has a first open end and second open end transversely angled with respect to each other. The elbow member has at least one circumferentially extending internal flange in proximity to the first end for engagement with the tubular conduit. The elbow member also has an external groove in proximity to the second end. A collar is fastened about the elbow member groove. The collar in turn engages a slot of said splash shield member. Preferably, one of the elbow member and collar has at least one external longitudinally extending rib for selective engagement to at least one longitudinal extending groove in the other of the elbow member and collar to provide for a discrete rotational angular adjustment of the elbow to the splash shield. Preferably the elbow member has a plurality of longitudinal extending external ribs in proximity to the second end for affixation to grooves in the collar at a selective rotated angle. It is desirable that the elbow has two shell sections connected together by a living hinge and closeable by a complementary latching element on each shell section.

In accordance with another aspect of the invention, the wiring protective dress includes a collar fastenable about the groove in the elbow member. The collar has an axial extending splined fitting for selectively engaging the elbow member in one of a plurality of relative angular positions with the elbow member. The collar has a spaced inner and outer mounting flange, is slideably receivable in a slot of the splash shield, and engages the wall of the splash shield.

In accordance with another aspect of the invention, the wiring protective dress includes the collar having two half sections connected together with a living hinge and closeable about a conduit and lockable by a complementary latching element on each half section. At least one internal circumferentially spanning rib engages with a groove of the conduit to retain attachment with the conduit.

In accordance with another aspect of the invention, a wiring protective assembly includes a splash shield having side walls and at least two slots for electrical harness wiring to pass therethrough. A first collar has spaced inner and outer mounting flanges for being installed in one of the slots. The first collar has at least one internal rib engaging a conduit that extends through said first collar and protrudes in a substantially transverse direction from the splash shield side wall. A second collar has spaced inner and outer mounting flanges for installation in another of the slots. The second collar is fastened about an elbow member. The elbow member has a passage with first and second open ends transversely angled with respect to each other and with the second end received through the collar and into the splash shield. The elbow member has at least one circumferentially extending integral flange in proximity to the first end for engagement with another conduit that is received in the second end. Preferably, the second collar and the elbow member has complementary spline connections to selectively mount to the elbow at one of a plurality of rotated angular positions along one of the side walls of the splash shield.

In this fashion a protective dress becomes quite adaptive for a variety of electrical wiring arrangements and still provides protection to the electrical wiring passing out of the splash shield and into the flexible conduits.

BRIEF DESCRIPTION OF THE DRAWINGS

Reference is now made to the accompanying drawings in which:

FIG. 6 is an enlarged view of the conduit guide positioned to be fastened to an end of a corrugated flexible conduit;

FIG. 7 is an enlarged view of a conduit fastener positioned to be fastened about an end of a corrugated flexible conduit; and FIG. 8 is an enlarged view of a conduit guide fastener about to be fastened to the conduit guide.

DESCRIPTION OF THE PREFERRED EMBODIMENT

Figure 1:
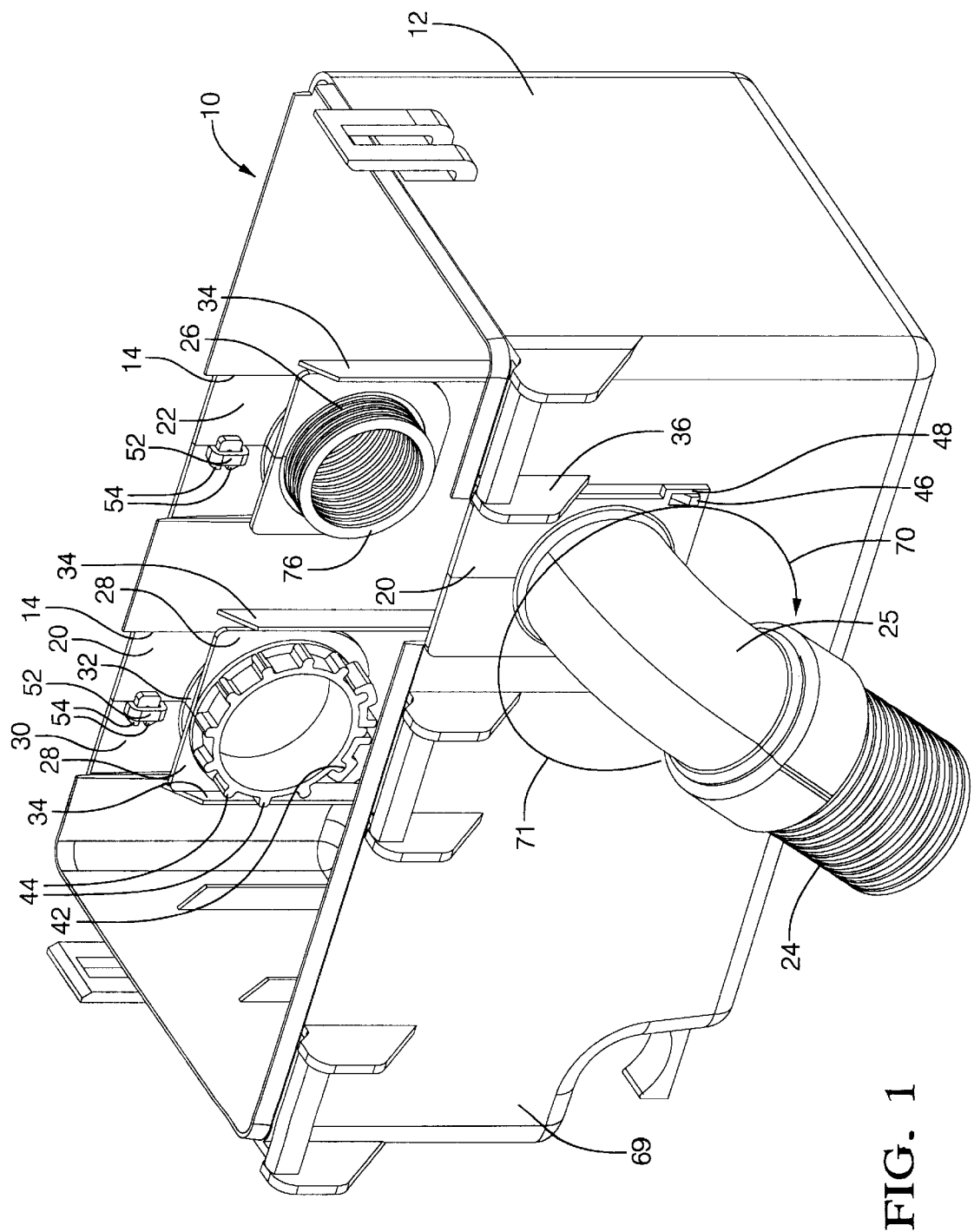
FIG. 1 is a perspective view of a splash shield assembly including a splash shield connected to corrugated flexible conduit in accordance with one embodiment of the invention.
Figure 2:
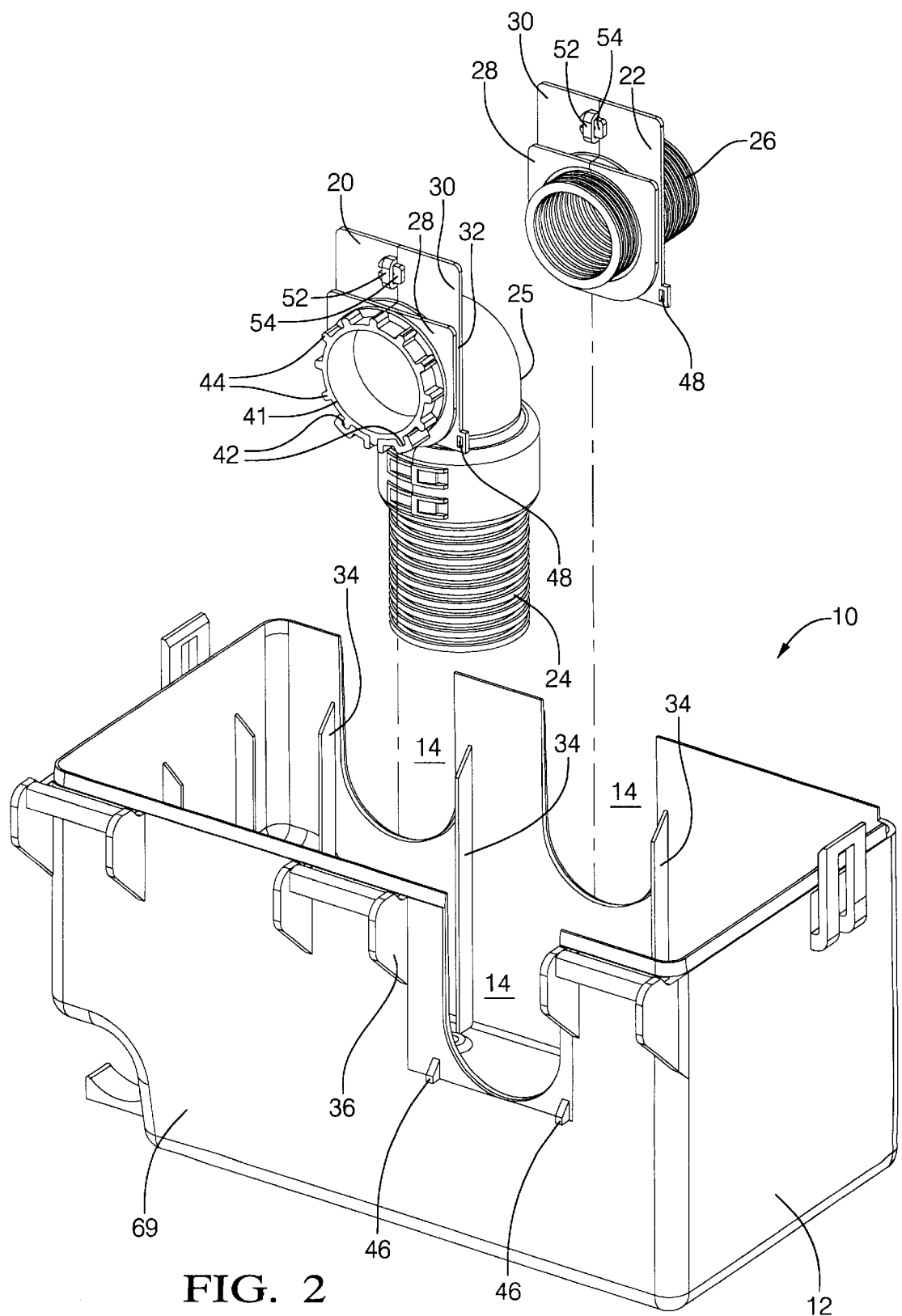
FIG. 2 is an exploded perspective view of the splash shield shown in FIG. 1 with one elbow member and a conduit connector shown ready for attachment to the splash shield.

Reference is now made to FIGS. 1 and 2 that illustrate a splash shield assembly 10 having a splash shield body 12. The splash shield body 12 mounts a pair of conduit guide fasteners 20 and a conduit fastener 22 in respective slots 14. Two conduits 24 are attached via a conduit guide 25 to fasteners 20. Conduit 26 is attached directly via a fastener 22. Conduit fastener 20, fastener 22 and conduit guide 25 are all molded from a plastic material. Conduits 24 and 26 are a commercially available plastic, flexible, corrugated tube which is axially slit through its length and is well known in the automotive wiring art for housing and protecting a plurality of electrical leads. Electrical wiring leads (not shown for simplicity of the drawings) extend through the conduits 24 and 26 and into and out of the splash shield body 12 where electrical connections are conventionally made.

Figure 3:
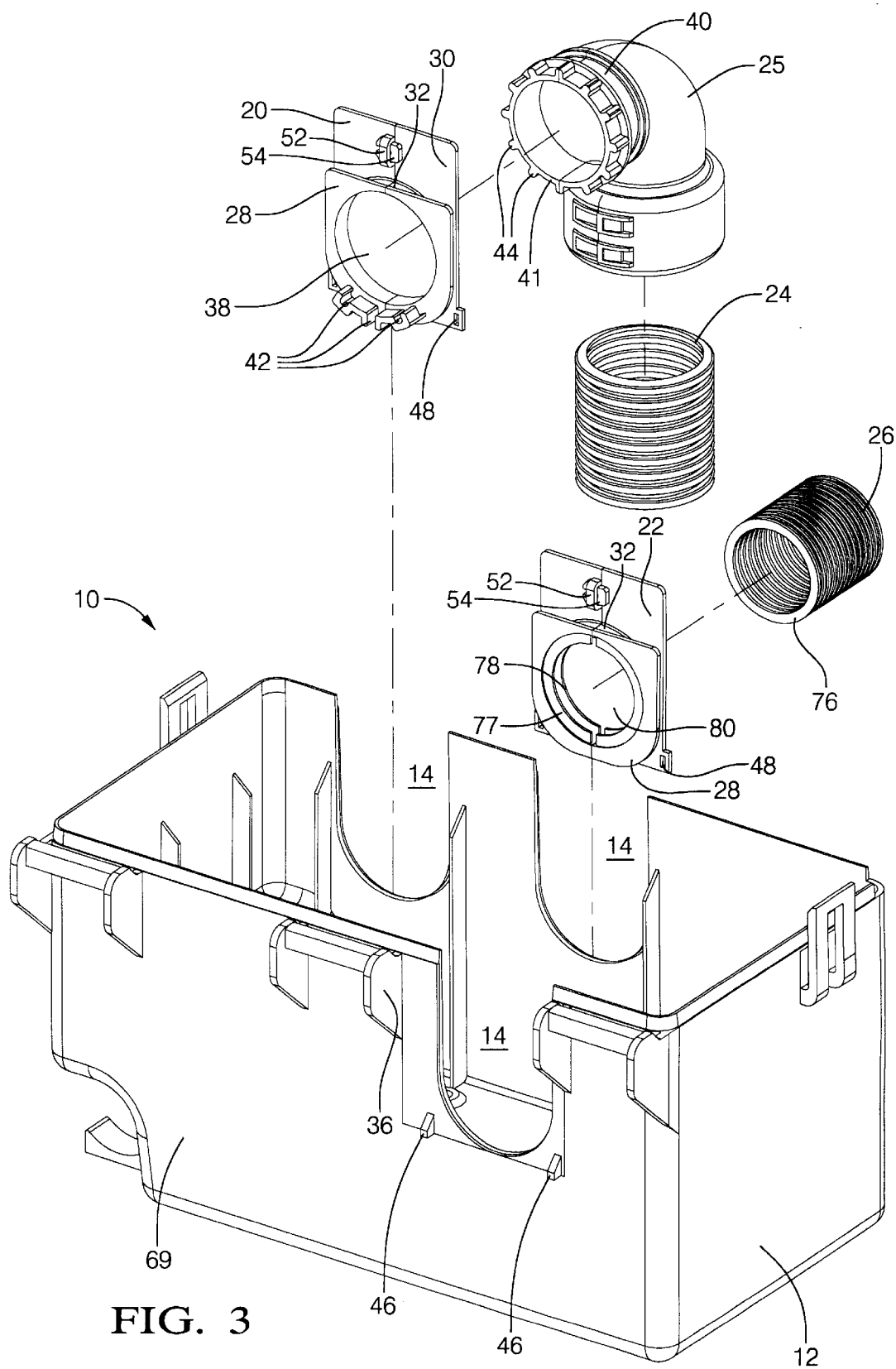
FIG. 3 is a view similar to FIG. 2 showing the member in an exploded disassembled fashion.

As shown more clearly in FIGS. 2 and 3, guide conduit fastener 20 has an interior mounting flange 28 and an exterior combination mounting flange and splash plate 30. The flange 28 and plate 30 are spaced apart to form a groove 32 therebetween which is received into a selected slot 14 of the splash shield 12. At the exterior side wall 69 of splash shield assembly 10, a pair of lock apertures 48 which engage respective lock ramps 46 near the bottom of slot 14 to lock the fastener 20 in slot 14. The splash shield 12 has a air of interior ribs 34 which abut the interior mounting flange 28 to prevent the fastener 20 from rotating in slot 14. An exterior rib 36 abutting splash plate 30 also prevents rotation of the fastener 20 in slot 14.

The conduit guide fastener 20, when in the closed position, as shown in FIG. 3, forms an aperture 38 therethrough. A groove 40 in proximity to end 41 of the conduit guide 25 seats in aperture 38 of fastener 20. A series of longitudinal grooves 42 extend from a lower section of fastener 20 and engage exterior extending splines 44 on end 41 of conduit guide 25 to prevent the conduit guide 25 from rotating within aperture 38 of fastener 20.

Figure 4:
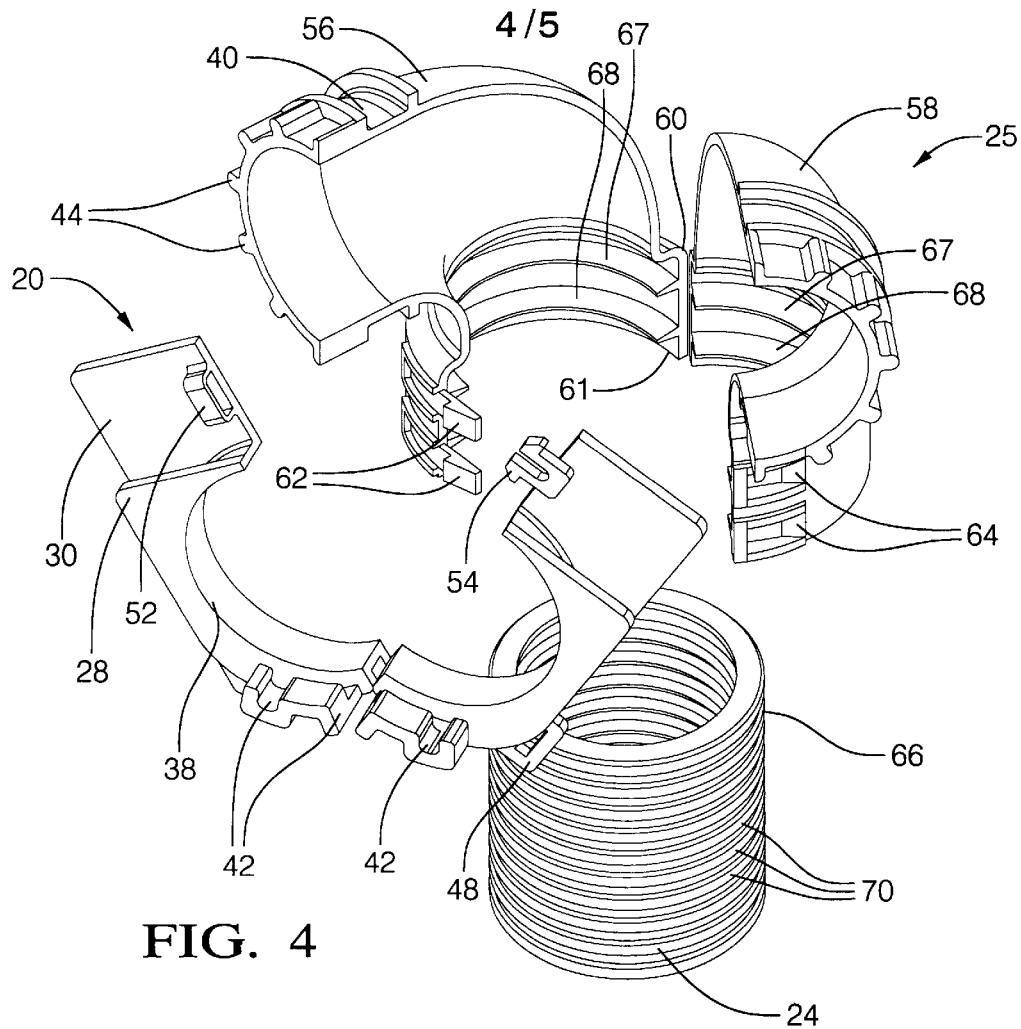
FIG. 4 is an enlarged view of the conduit guide, and conduit fastener shown in an open position disassembled from a corrugated flexible conduit.

As shown more clearly in FIGS. 4 and 8, the conduit guide fastener 20 has a living hinge 50 that allows the fastener 20 to move between a closed and open position. An opposite end has complementary latching elements such as a rectangular receptacle 52 and resilient latching arms 54 that locks the fastener 20 in the closed position shown in FIGS. 2 and 3.

The conduit guide 25 has two shell sections 56 and 58 connected together by a living hinge 60 in proximity to end 61 as shown in FIGS. 4 and 6. Circumferentially opposite from the hinge 60 on respective shell sections 56 and 58 are complementary flexible latching arms 62 and latching arm slots 64. The shell sections 56 and 58 of the conduit guide 25 move from an open position about an end 66 of conduit 24 to a closed position where the latching arms 62 snap fit into slots 64 and lock the sections 56 and 58 together. Two circumferentially extending internal ribs 67 and 68 engage grooves 70 in the conduit to retain engagement of the conduit 24 to the conduit guide 25. As shown in FIG. 8, after the conduit guide 25 is secured to conduit 24, the fastener 20 can then be fastened over groove 40 to help retain the end 41 in the closed position and to couple the conduit guide 25 to the splash shield 12. The splined connection using grooves 42 and ribs 44 lock the conduit guide 25 in an adjustably selected rotated position relative to the fastener 20 and in turn to the splash shield 12.

The conduit guide 25 is elbow shaped with end 41 bent traversely with respect to end 61 to allow wire to bend about 90° therein. In this fashion, as shown in FIGS. 1 and 2, the conduit 24 runs along the side wall 69 of splash shield. The angle at which conduit 24 is positioned can be widely adjusted as indicated by arrows 71 in FIG. 1 through the use of the splined connection of grooves 42 and ribs 44.

The conduit guide 25 can be easily modified to accommodate differently sized conduits. Ribs 67 and 68 are molded to the desired internal diameter during the molding process. In this manner conduits 24 of a different diameter may be used with the same splash shield without modifying the size of the slots 14.

Figure 5:
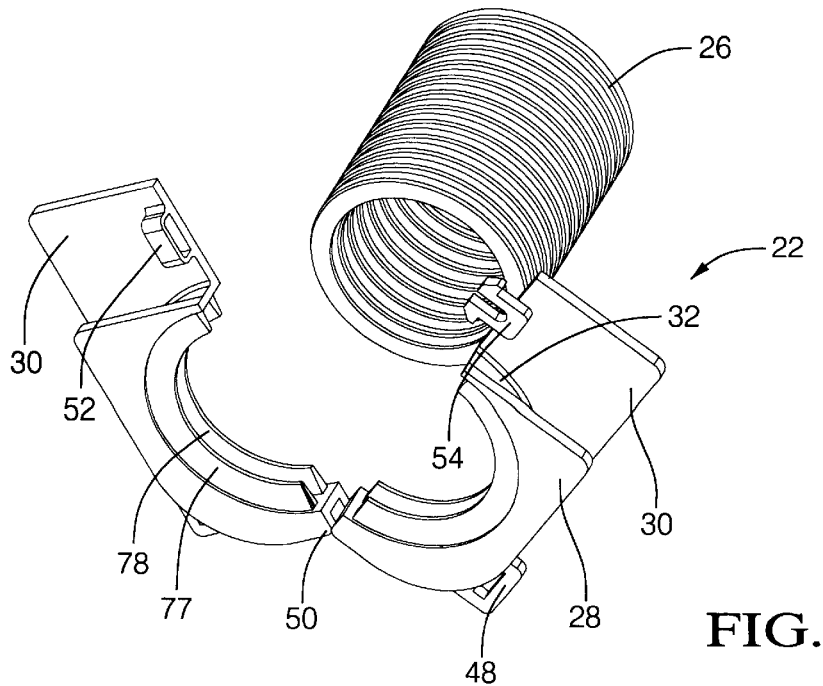
FIG. 5 is an enlarged view of another conduit fastener shown in the open position disassembled from a corrugated flexible conduit.

The splash shield may also easily accommodate differently sized conduits 26 that extend outward from a wall of the splash shield in a traverse direction. The conduit 26 is engaged via a pair of circumferentially extending internal ribs 77 and 78 that surround opening 80 in fastener 22 as shown in FIG. 3. The ribs engage grooves 70 in the conduit 26. The fastener 22 does not have splined groove 42, but the rest of the fastener 22 is constructed similarly to fastener 20 with the live hinge 50 and latching elements 52 and 54, interior mounting flange 28 and exterior splash plate 30 spaced apart to form a groove 32, and lock aperture 48. The fastener 22 is shown in the open position in FIG. 5. The fastener is positioned in proximity to an end 76 of conduit 26 as shown in FIG. 7. The fastener 22 is then closed about conduit 26 in proximity to end 76 and the latching elements 52 and 54 retain the fastener in the closed position. The fastener 22 then is slid in place to have groove 32 engage slot 14 in splash shield 12. The fastener 22 is prevented from rotation by internal and external ribs 34 and 36 on shield 12. Lock apertures 48 engage locking ramps 46 in the shield 12 to lock the fastener in slot 14. The internal diameter of the ribs 77 and 78 are molded to correspond to the outer diameter of the groove 70. In this fashion, different fasteners 22 with differently sized ribs 77 and 78 may be made to accommodate different diameter sized conduits 26.

In this fashion, a splash shield that can be attached to conduits 24 and 26 that can extend traverse or along a wall of the splash shield. Furthermore, the direction of the conduit 24 that extends along the wall of the shield may be adjusted by selective rotation of a conduit guide 25 within the conduit guide fastener 20. Furthermore, the mold for either the conduit guide 25 or fastener 22 may have an interchangeable core for the internal circumferentially extending internal ribs 67, 68, 77, and 78 to accommodate different diameter conduits 24 and 26. The change of conduit diameter and directions are now possible without any change to the splash shield 12 or to its slots 14. The conduits 24 extending along shield allows placement of an electrical harness bundle very close to the splash shield which is desirable in a limited space.

The use of the conduit guide 25 allows for protection of the electrical harness bundles from the splash shield 12 to the protective conduits 24. The fasteners 20 and 22 cover the splash shield slots 14 completely and also make a cleaner looking protective assembly. The fasteners 20 and 22 and conduit guide 25 provide for a great amount of adjustability but after installation provides for a stable assembly that offers a great amount of protection for the electrical wiring extending from the splash shield to the conduits 24 and 26.

Other variations and modifications are possible without departing from the spirit and scope of the invention as defined in the appended claims.

What is claimed is:

1. A wiring protective dress for electrical wiring extending between a splash shield member and a tubular conduit, said protective dress comprising:

an elbow member having a passage through which electrical wiring can extend therethrough, with a first open end and a second open end transversely angled with respect to each other;

at least one circumferentially extending internal flange in proximity to the first open end for engagement with said tubular conduit;

an external groove in proximity to the second open end for engagement to a collar fastened about the elbow member, said collar being slidably engagable to a slot having an open end in said splash shield member.

2. A wiring protective dress as defined in claim 1 further comprising:

one of said elbow member and collar having at least one external longitudinally extending rib for selective engagement to at least one longitudinal extending groove in the other of the elbow member and collar to provide for a discrete rotational angular adjustment of the elbow member to the splash shield.

3. A wiring protective dress as defined in claim 2 further comprising:

said elbow member having two shell sections connected together by a living hinge and closeable by a complementary latching element on each shell section.

4. A wiring protective dress as defined in claim 2 wherein said at least one external longitudinally extending rib is a plurality of external longitudinally extending ribs located in said elbow member in proximity to the second open end for affixation to grooves in said collar at a selective rotated angle.

5. A wiring protective dress as defined in claim 1 further comprising:

said elbow member having two shell sections connected together by a living hinge and closeable by a complementary latching element on each shell section.

6. A wiring protective dress for electrical wiring extending between a splash shield and a tubular conduit, said protective dress comprising:

a collar fastenable about a groove in an elbow member, said collar having at least an axial extending splined fitting for selectively engaging said elbow member in one of a plurality of relative rotated angular positions with said elbow member; said collar having a spaced inner and outer mounting flange, said collar being slideably receivable in an open end of a slot of the splash shield and engaging the wall of the splash shield.

7. A wiring protective dress as defined in claim 6 further comprising:

said collar having two half sections connected together with a living hinge and closeable about said elbow by a complementary latching element on each half section.

8. A wiring protective dress for electrical wiring extending between a splash shield and a tubular conduit, said wiring protective dress comprising:

a collar having two half sections connected together with a living hinge and closeable about a conduit and lockable by a complementary latching element on each half section;

at least one internal circumferentially spanning rib engagable with a groove in said conduit.

9. A wiring protective assembly comprising:

a splash shield having side walls and at least two open ended slots for electrical harness wiring to pass therethrough;

a first collar having spaced inner and outer mounting flanges for being slidably installed in one of said slots;

said first collar having at least one internal rib engaging a conduit that extends through said first collar and protrudes substantially transverse from said splash shield side wall;

a second collar having spaced inner and outer mounting flanges for installation in another of said slots;

said second collar fastened about an elbow member;

said elbow member having a passage with a respective first and a second open end transversely angled with respect to each other, said second open end received through said collar and into said splash shield;

at least one circumferentially extending integral flange in proximity to said first open end for engagement with another conduit that is received in said second open end of said elbow member.

10. A wiring protective assembly as defined in claim 9 further comprising:

said second collar and said elbow member having complementary spline connection to selectively mount said elbow member at one of a plurality of rotated angular positions along one of the side walls of said splash shield.

11. A wiring protective assembly as defined in claim 10 further comprising:

said elbow member having two shell sections connected together with a living hinge and secured in a closed positions by a complementary latching element on each shell section.

12. A wiring protective assembly as defined in claim 9 further comprising:

said elbow member having two shell sections connected together with a living hinge and secured in a closed positions by a complementary latching element on each shell section.

13. A wiring protective assembly as defined in claim 12 further comprising:

each collar having two half sections connected together with a living hinge and closeable about one elbow member or conduit and lockable by a complementary latching element on each half section.

14. A wiring protective assembly as defined in claim 9 further comprising:

each collar having two half sections connected together with a living hinge and closeable about one elbow member or conduit and lockable by a complementary latching element on each half section.

* * * * *